April 28, 1942.  B. GASPAR  2,281,149
COLOR PHOTOGRAPHIC MULTILAYER MATERIAL
Filed July 12, 1939
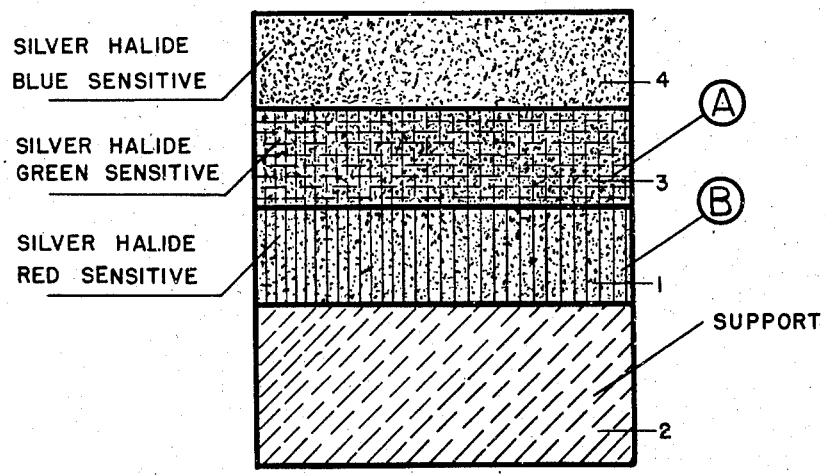
Ⓐ DYED WITH YELLOW AZO DYE AND
Ⓑ DYED WITH MAGENTA AZO DYE HAVING
THE GENERAL FORMULA ———
$$R_1-N=N-R_2-A-R_3-N=N-R_4$$
Inventor
BELA GASPAR
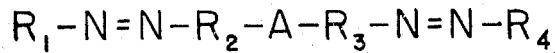
Attorney Patented Apr. 28, 1942

2,281,149

UNITED STATES PATENT OFFICE 2,281,149

COLOR PHOTOGRAPHIC MULTILAYER MATERIAL

Bela Gaspar, Brussels-Forest, Belgium, assignor to Chromogen, Incorporated, a corporation of Nevada Application July 12, 1939, Serial No. 284,104 In Germany July 12, 1938

3 Claims. (Cl. 95—2)

In my Letters Patent 2,183,394, granted December 12, 1939, a multi-layer material for color photographic exposures has been described in which the emulsion layer which during the exposure faces the camera lens consists of a colorless blue-sensitive silver halide emulsion behind which follow a green-sensitive and a red-sensitive layer, the green-sensitive layer containing a yellow dye and the red-sensitive layer a magenta dye. During the exposure these dyes act as light-filters; the yellow dye, for example, excludes the blue light rays from the exposure of the green-sensitive layer and allows only the green and red light rays to enter and penetrate this layer in such a manner that the green light rays are recorded in the layer and that the red light rays can reach the next layer. The magenta dye also acts as a filter insofar as it allows the red light rays but not the green light rays to enter this emulsion layer. Besides this filter effect these dyes also have as their object to form in the layers after the exposure the desired dye image. Therefore they must be stable against the usual photographic treating baths but they must be able to be destroyed locally in dependence on the silver image developed in the layer so that the part of the dye not destroyed remains as the image. For this purpose several azo dyes have already been named as useful.

Apart from the requirements which every dye by itself must fulfill in consideration of the above described conditions it has been found that for the preparation of taking materials of a very high speed it is not a matter of simply employing two dyes each one of which, considered alone shows the necessary filter properties and the necessary stability to the usual treating baths, and the necessary property of being bleached out in dependence on the silver image. Since the different dyes behave differently toward a light-sensitive emulsion, i. e. one of them decreasing, for example, the light sensitivity more than the second one, it is obvious that in a taking material in which the exposure times for all layers are equal, it is always the more unsuitable dye which sets the upper limit of the range of possibilities when one is employing a taking material which is composed of the different emulsions. Therefore the superior properties of a dye must remain unused if it is combined in a taking material with another dye the properties of which are inferior.

A large amount of comprehensive research work has been carried out on an extensive series of dyes, some of them having already been known for this purpose while the rest were unknown for this purpose, to examine their suitability and especially to determine which yellow dyes influence the green sensitivity of the emulsion the least and which magenta dyes influence the red sensitivity of the emulsion the least. On the basis of the results of this investigation dyes have been found which employed in the different layers yield a sensitivity as equally high as possible in all of the layers. By means of these experiments it has been found that in a great number of cases the sensitivity of the light-sensitive silver halide emulsions—apart from decrease of sensitivity for light rays of complementary color produced by the filter effect—is reduced the least by such azo dyes which do not contain phenolic hydoxy groups in their molecule.

The best results have been obtained by the use of acid dyes of the following general formula:

in which $R_1$, $R_2$, $R_3$ and $R_4$ are aromatic radicals, at least one of which contains an acid substituent and at least one of which contains a basic nitrogen substituent or a phenolic hydroxy group but in which not more than one radical contains simultaneously a sulphonic acid substituent and a phenolic hydroxy group, A representing a direct linkage or one of the groups CH=CH and NH—CO—NH between the radicals $R_2$ and $R_3$.

As a matter of fact, it is possible with the aid of such dyes, i. e., if every one of the colored layers contains a dye corresponding to the above given general formula, to prepare a light-sensitive color photographic taking material whose sensitivity in spite of the presence of the dyes is hardly reduced as compared with the sensitivity of an undyed material and which has practically as high a sensitivity as it is possible to obtain with the technique employed at present in the preparation of silver halide emulsions.

Azo dyes which correspond to the general formula and which can be used for the preparation of the material are, for example, the red dyes Direct red 4B (Schultz Farbstofftabellen, Leipzig 1931, 7th ed., vol. 1, No. 448), Hessisch Purpur NN (Schultz l. c. No. 722), Dianol brilliant red R extra (Schultz l. c., No. 425), Benzopurpurine 10 B (Schultz l. c., No. 489), Congo corinth B (Schultz l. c., No. 447), Rosazurin BB (Schultz, l. c., No. 437), Rosazurin B (Schultz l. c., No 456), and the yellow dyes Milling Yellow G (Schultz l. c., No. 726), and Pyramine orange 2R (Schultz l. c., No. 364). The dyes are preferably employed in the form of their insoluble salts, especially in the form of their salts with organic bases, for example, diphenylguanidine, or their calcium salts. It should be noted that the use of Milling Yellow G for coloring silver halide emulsions has already been described. But since the other dyes used together with this dye were far less suitable, the full advantage could not be obtained from the efficiency of the dye Milling Yellow G.

The figure of the drawing represents a cross section of a photographic material wherein the support and respective layers are drawn to an exaggerated scale to illustrate an embodiment of the invention.

As shown in the figure, a red-sensitive magenta colored silver halide layer 1 is placed upon a support 2 and a green-sensitive yellow colored silver halide layer 3 is superposed thereon. A colorless blue-sensitive silver halide layer 4 is shown in the figure superposed on the green-sensitive layer 3 to complete the multi-layer material.

The red-sensitive layer 1 is prepared from a high sensitive negative emulsion which is sensitized with naphthothiocarbocyanine, selenocarbocyanine or another suitable panchromatic or red sensitizer. To this emulsion a 2½ per cent solution of Benzopurpurine 10 B (Schultz l. c., No. 489) is added in an amount such that in the finished coated layer 0.6 gram of the dye is contained in a square meter and that the layer shows with light of the wave length 525 $\mu\mu$ an optical density of 2.2.

The green-sensitive emulsion layer 3 is prepared from a highly sensitive emulsion of the same kind which was used for the preparation of the red-sensitive emulsion. To this emulsion is added a 1% solution of Milling Yellow G in an amount which corresponds to a dye content of 0.75 gram per square meter. At this dye concentration the layer shows with light of the wave length 460 $\mu\mu$ an optical density of about 2.2. After the addition of the dye there is added to the emulsion a solution of diphenylguanidine acetate whereby the dye is converted into the insoluble diphenylguanidine salt. The emulsion is sensitized for green light with thio-pseudocyanine.

The colorless blue-sensitive emulsion layer 4 is prepared from a blue-sensitive highly transparent negative emulsion whose sensitivity is about half as high as the sensitivity of the highly sensitive negative emulsion used for the preparation of the other two layers and which has a speed of about 25 to 26° Sch.

The three emulsions are either coated superimposed to each other on one side of a transparent support as shown in the drawing or the blue-sensitive or the red-sensitive emulsion is coated on one side of the support and the two other layers on the other side of the support in such a manner that firstly the blue-sensitive, secondly the green-sensitive layer and finally the red-sensitive emulsion layer lies in the direction of the incident light. For the preparation of the layers there are employed per square meter about 140 cc. of the blue-sensitive and the red-sensitive emulsion and about 220 cc. of the green-sensitive emulsion.

Whereas a panchromatic film for ordinary black and white photography yields a joint record of all color values, a color photographic three layer exposure material records the three primary colors separately in the three layers, but if prepared according to the present invention it gives three separate records, which together are equivalent to the panchromatic record obtained in an identically exposed ordinary black and white panchromatic film of at least 24° Sch. All of the color separation records are substantially equivalent to each other, each recording substantially the same range of light intensities between high lights and deepest shadows. By the use of emulsions having a higher inherent speed a three-layer exposure material can be produced, which does not require longer exposure than a black and white film of 27° Sch.

If necessary, the single emulsion layers can be divided from each other by thin colorless intermediate layers.

Sometimes it is not necessary to precipitate the dyes in the layer, namely, if the dyes adhere as such sufficiently fast to the gelatin. For the precipitation especially guanidine derivatives are used.

The dyes used are preferably disazo dyes and among the magenta disazo dyes especially those of the benzopurpurine dye type.

What is claimed is:

1. A light-sensitive exposure material for color photographic purposes comprising three light-sensitive silver halide emulsion layers sensitized predominantly to blue, green and red light respectively and arranged the one behind the other, a yellow azo dye in the layer predominantly sensitized to green light and a magenta azo dye in the layer predominantly sensitized to red light, both the yellow dye and the magenta dye corresponding to the general formula $$R_1-N=N-R_2-R_3-N=N-R_4$$

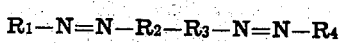

in which $R_1$, $R_2$, $R_3$, $R_4$ are aromatic radicals, at least one of the said radicals containing an acid substituent and at least one of said radicals containing a substituent selected from the group consisting of basic nitrogen substituents and phenolic hydroxy groups, but not more than one of the radicals $R_1$, $R_2$, $R_3$, $R_4$ containing simultaneously a sulphonic acid substituent and a phenolic hydroxy group, and in which the direct linkage between the radicals $R_2$ and $R_3$ may be replaced by one of the groups $-CH=CH-$ and $-NH-CO-NH-$.

2. A light-sensitive exposure material comprising a blue-sensitive colorless silver halide emulsion layer in front of a green-sensitive silver halide emulsion dyed yellow by the dye Chrysophenine and a red-sensitive silver halide emulsion dyed magenta by a Benzopurpurine dye, the blue-sensitive emulsion layer having a speed of more than 24° Sch., the green-sensitive emulsion and the red-sensitive emulsion having for green light and red light respectively, a speed which is sufficient to record green and red light intensity ranges substantially equal to the range of blue light intensities recorded by the blue-sensitive layer.

3. A light-sensitive exposure material for color photographic purposes comprising three light-sensitive silver halide emulsion layers in superposition, one layer being undyed and sensitive to blue light and having a speed of at least 24° Sch., the second layer being dyed yellow by a reducible yellow azo dye and being predominantly sensitive to green light, the third layer being dyed by a reducible magenta azo dye and being predominantly sensitive to red light, both the reducible yellow azo dye and the reducible magenta azo dye corresponding to the general formula $$R_1-N=N-R_2-R_3-N=N-R_4$$

in which $R_1$, $R_2$, $R_3$, $R_4$ are aromatic radicals, at least one of the said radicals containing an acid substituent and at least one of said radicals containing a substituent selected from the group consisting of basic nitrogen substituents and phenolic hydroxy groups, but not more than one of the radicals $R_1$, $R_2$, $R_3$, $R_4$ containing simultaneously a sulphonic acid substituent and a phenolic hydroxy group, and in which the direct linkage between the radicals $R_2$ and $R_3$ may be replaced by one of the groups —CH=CH— and —NH—CO—NH—, the multilayer material having such a speed that by the exposure there are recorded in all of the layers silver images which are together equivalent to the silver image recorded by an identically exposed panchromatic black and white film of more than 24° Sch.

BELA GASPAR.